(12) United States Patent
Liu

(10) Patent No.: US 7,862,231 B2
(45) Date of Patent: Jan. 4, 2011

(54) APPARATUS AND METHOD FOR TESTING TEMPERATURE

(75) Inventor: Hsing-Chang Liu, Taipei Hsien (TW)

(73) Assignee: Foxnum Technology Co., Ltd., Tucheng, Taipei County (TW)

( * ) Notice: Subject to any disclaimer, the term of this patent is extended or adjusted under 35 U.S.C. 154(b) by 494 days.

(21) Appl. No.: 12/045,672

(22) Filed: Mar. 10, 2008

(65) Prior Publication Data

US 2009/0168834 A1 Jul. 2, 2009

(30) Foreign Application Priority Data

Dec. 27, 2007 (CN) .......................... 2007 1 0203437

(51) Int. Cl.
*G01K 1/02* (2006.01)
*G01K 7/02* (2006.01)
*G01K 3/08* (2006.01)

(52) U.S. Cl. .................. 374/141; 374/179; 374/184; 374/137; 374/4; 374/57; 700/1; 700/174; 702/1; 713/300

(58) Field of Classification Search .................. 374/141, 374/179, 183, 185, 163, 170, 100, 152, 137, 374/166, 167, 29, 30
See application file for complete search history.

(56) References Cited

U.S. PATENT DOCUMENTS

| | | | | |
|---|---|---|---|---|
| 2,678,422 A | * | 5/1954 | Broomell, Jr. et al. | 324/99 R |
| 2,858,527 A | * | 10/1958 | Bowditch et al. | 340/870.43 |
| 2,937,369 A | * | 5/1960 | Newbold et al. | 340/870.42 |
| 3,459,925 A | * | 8/1969 | Wilson et al. | 376/207 |
| 3,719,071 A | * | 3/1973 | Hohenberg | 374/111 |
| 3,909,811 A | * | 9/1975 | Adler | 340/870.13 |
| 3,911,745 A | * | 10/1975 | Erhardt | 374/181 |
| 4,115,785 A | * | 9/1978 | Hoopes et al. | 346/34 |
| 4,482,261 A | * | 11/1984 | Dewey et al. | 374/181 |
| 5,553,113 A | * | 9/1996 | Weedon | 378/98.5 |
| 5,836,156 A | * | 11/1998 | Watabe et al. | 60/276 |
| 6,045,260 A | * | 4/2000 | Schwartz et al. | 374/183 |
| 6,704,875 B1 | * | 3/2004 | Kinoshita et al. | 713/300 |
| 7,571,022 B2 | * | 8/2009 | Jalluri et al. | 700/160 |

* cited by examiner

*Primary Examiner*—Gail Verbitsky
(74) *Attorney, Agent, or Firm*—Frank R. Niranjan

(57) ABSTRACT

An apparatus for testing temperature includes a plurality of thermocouples, a plurality of relays, a ground circuit, a compensation circuit, a power supply circuit, a switch circuit, and an MPU. The thermo-couples samples temperatures at different locations in a CNC machine, each thermo-couple is connected to a corresponding relay and selectively connected to the switch circuit by turning on or off the corresponding relay, the compensation circuit includes a cold junction compensator and a first relay, the ground circuit includes a ground terminal and a second relay, the power circuit includes a power supply and a third relay. The first, second, and third relays selectively turn on or off to connect the cold junction compensator, the ground terminal, or the power supply to the switch circuit. The switch circuit includes a capacitor and a fourth relay, the fourth relay is selectively connected the MPU, the ground circuit, the compensation circuit, or the power supply circuit to the capacitor, the MPU obtains voltage at the capacitor, and converting the voltage to a temperature signal.

8 Claims, 2 Drawing Sheets

APPARATUS AND METHOD FOR TESTING TEMPERATURE

BACKGROUND OF THE INVENTION

1. Field of the Invention

The present invention relates to an apparatus and a method for testing temperature in a Computer Numerically Controlled (CNC) machine.

2. Description of Related Art

In a CNC machine, it is important to test temperature at different locations in the CNC machine. A conventional method to test the temperature is using a multiplexer and an analog to digital (A/D) converter. However, if creepage at a test point occurs, the multiplexer and the A/D converter may be ruined.

What is needed, therefore, is an apparatus and a method for testing temperature in a CNC machine which can prevent creepage.

SUMMARY

An apparatus for testing temperature comprises a plurality of thermo-couples, a plurality of relays, a ground circuit, a compensation circuit, a power supply circuit, a switch circuit, and an MPU. The thermocouples are configured for sampling temperature at different locations in the CNC machine, the thermocouples are respectively connected to a corresponding relay and selectively connected to the switch circuit by turning on or off the corresponding relay, the compensation circuit comprises a cold junction compensator and a first relay, the ground circuit comprises a ground terminal and a second relay, the power circuit comprises a power supply and a third relay. The first, second, and third relays are selectively connected the cold junction compensator, the ground terminal, and the power supply to the switch circuit. The switch circuit comprises a capacitor and a fourth relay, the fourth relay is selectively connected the MPU, the ground circuit, the compensation circuit, or the power supply circuit connected to the capacitor, the MPU is configured for obtaining a voltage at the capacitor, and converting the voltage to a temperature signal.

Other objects, advantages and novel features of the present invention will become more apparent from the following detailed description of preferred embodiments when taken in conjunction with the accompanying drawings, in which:

DETAILED DESCRIPTION

Figure 1:
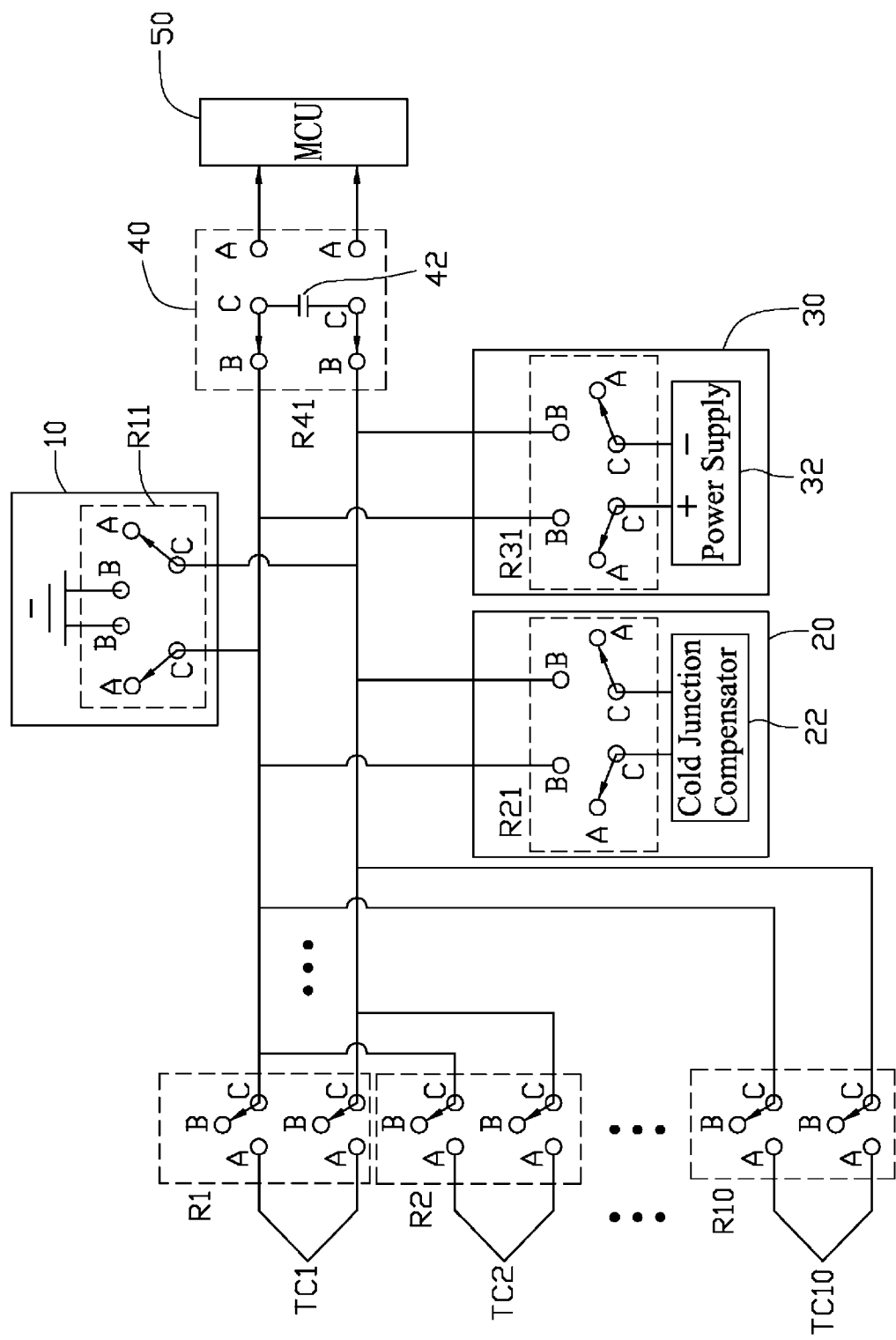
FIG. 1 is a circuit diagram of an apparatus for testing temperature in accordance with an embodiment of the present invention.

Referring to FIG. 1, an apparatus for testing temperature in accordance with an embodiment of the present invention includes a plurality of thermo-couples TC1-TC10, a plurality of relays R1-R10, a ground circuit 10, a compensation circuit 20, a power supply circuit 30, a switch circuit 40, and a micro processor unit (MPU) 50. The ground circuit 10, compensation circuit 20, power supply circuit 30, and switch circuit 40 include relays R11, R21, R31, and R41 respectively. Each relay R1-R11, R21, R31, R41 includes two groups of contacts, each group includes contacts A, B, and C. The thermo-couples TC1-TC10 are configured to sample temperature at different locations in the CNC machine, and convert the temperature into voltage signals. The thermo-couples TC1-TC10 and corresponding relays R1-R10 form a plurality of testing channels TC channel 0-TC channel 9. Two terminals of each thermo-couple TC1-TC10 are connected to the contacts A of a corresponding relay R1-R10, contacts C of each relay R1-R10 are connected to the contacts B of the relay R41, a capacitor C is connected between the contacts C of the relay R41, and the contacts A of the relay R41 are connected to the MPU 50. The contacts B of the relay R11 are both grounded, the contacts C of the relay R11 are respectively connected to the contacts B of the relay R41. The compensation circuit 20 includes a cold junction compensator 22, two terminals of the cold junction compensator 22 are connected to the contacts C of the relay R21 respectively, contacts B of the relay R21 are connected to the contacts B of the relay R41 respectively. The power supply circuit 30 includes a power supply 32, a positive terminal and a negative terminal of the power supply 32 are connected to the contacts C of the relay R31 respectively, the contacts B of the relay R31 are connected to the contacts B of the relay R41 respectively. In this embodiment, the voltage of the power supply 32 is higher than the voltage that the thermo-couple can sample, in other embodiments, the voltage of the power supply 32 can be set lower than the voltage the thermo-couple can sample. In the original state, the contacts C of the relays R1-R10 are connected to the corresponding contacts B of the relays R1-R10 respectively. The contacts C of the relays R11, R21, R31 are connected to the corresponding contacts A respectively. The contacts C of the relay R41 are connected to the corresponding contacts B respectively.

Figure 2:
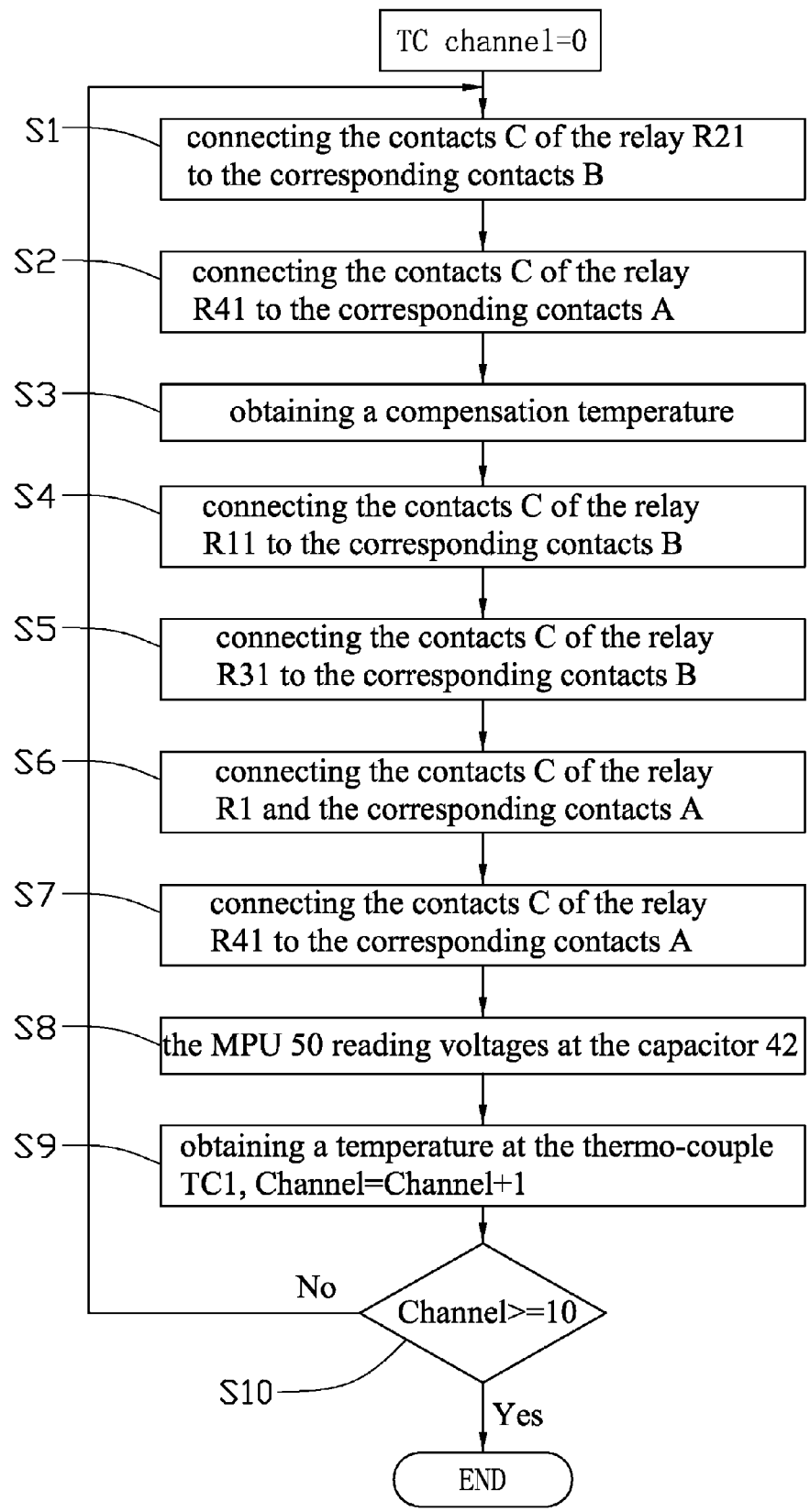
FIG. 2 is a flow chart of a method for testing temperature in accordance with an embodiment of the present invention.

Referring to FIG. 2, the method using the apparatus above to test temperature includes the following steps:

S1: the contacts C of the relay R21 connect to the corresponding contacts B, the other relays maintain original state, the cold junction compensator 22 is connected to the switch circuit 40, the cold junction compensator 22 charges the capacitor 42;

S2: after charging of the capacitor 42 is completed, the contacts C of the relay R41 connect to the corresponding contacts A, the other relays return to their original states;

S3: the MPU 50 reading the voltage at the capacitor 42 and converting the voltage to a compensation temperature;

S4: the contacts C of the relay R11 connect to the corresponding contacts B, the other relays return to their original state, the contacts C of the relay R41 are connected to ground, thus the capacitor 42 discharges through the relay R11;

S5: the contacts C of the relay R31 connect to the corresponding contacts B, the other relays return to their original state, the power supply 32 charges the capacitor 42;

S6: the contacts C of the relay R1 connect to the corresponding contacts A, if the thermo-couple TC1 is broken, the capacitor 42 cannot release voltage; if the thermo-couple TC1 is good, the capacitor 42 discharges through the thermo-couple TC1, and then is charged by the thermo-couple TC1;

S7: the contacts C of the relay R41 connect to the corresponding contacts A respectively, the other relays return to their original state;

S8: the MPU 50 reads voltage at the capacitor 42;

S9: if the voltage the MPU 50 obtains is equal to the voltage of the power supply 32, the thermo-couple TC1 is broken; if not, the temperature at the thermo-couple TC1 is the sum of the temperature corresponding to the voltage the MPU 50 obtained and the compensation temperature, then continue to test the next TC channel 1.

S10: judging whether the code of the channel to be tested is greater than or equal to 10, if yes, the test is terminated; if not, return to the step S1, and go on testing.

The apparatus uses relays as the switches, and all the testing channels use a common capacitor 42, when in use, the relays and the capacitor 42 insulate the thermo-couples and the MPU 50, thus eliminating creepage and interference to the MPU 50.

The foregoing description of the exemplary embodiment of the invention has been presented only for the purposes of illustration and description and is not intended to be exhaustive or to limit the invention to the precise forms disclosed. Many modifications and variations are possible in light of the above teaching. The embodiment was chosen and described in order to explain the principles of the invention and its practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiment described therein.

What is claimed is:

1. An apparatus for testing temperature comprising a plurality of thermo-couples, a plurality of relays, a ground circuit, a compensation circuit, a power supply circuit, a switch circuit, and a micro processor unit (MPU), the thermo-couples configured for sampling temperature at different locations in the CNC machine, the thermo-couples connected to a corresponding relay and selectively connected to the switch circuit by turning on or off the corresponding relay, the compensation circuit comprising a cold junction compensator and a first relay, the ground circuit comprising a ground terminal and a second relay, the power circuit comprising a power supply and a third relay, the first, second, and third relays selectively connected the cold junction compensator, the ground terminal, the power supply to the switch circuit, the switch circuit comprising a capacitor and a fourth relay, the fourth relay selectively connected to the MPU, the ground circuit, the compensation circuit, or the power supply circuit to the capacitor, the MPU configured for obtaining a voltage at the capacitor, and converting the voltage to a temperature signal.

2. The apparatus as claimed in claim 1, wherein each relay comprises two groups of contacts, each group comprises a first contact, a second contact, and a third contact.

3. The apparatus as claimed in claim 2, wherein in original state, two terminals of each thermo-couple are connected to the first contacts of the corresponding relay connected thereto, the third contacts of the relays connected to the thermo-couples are connected to the second contacts of the fourth relay, the first contacts of the fourth relay are connected to the MPU, the third contacts of the relays connected to the thermo-couples are connected to the corresponding second contacts, the third contacts of the fourth relay are connected to the corresponding second contacts.

4. The apparatus as claimed in claim 3, wherein in original state, the second contacts of the second relay are all grounded, the third contacts of the second relay are connected to the second contacts of the fourth relay, the first contacts of the second relay are connected to the corresponding first contacts.

5. The apparatus as claimed in claim 4, wherein in original state, the second contacts of the first relay are connected to the second contacts of the fourth relay, the third contacts of the first relay are connected to two terminals of the cold junction compensator, the third contacts of the first relay are connected to the corresponding first contacts.

6. The apparatus as claimed in claim 5, wherein in original state, the second contacts of the third relay are connected to the second contacts of the fourth relay, the third contacts of the third relay are connected to the power supply, and also connected to the corresponding first contacts.

7. The apparatus as claimed in claim 1, the voltage of the power supply is higher than the maximum voltage that the thermo-couple can sample, or lower than the minimum voltage that the thermo-couple can sample.

8. A method using the apparatus of claim 1 to test temperature, comprising the steps of:
    connecting the third contacts of the first relay and the corresponding second contacts to connect the cold junction compensator to the capacitor;
    connecting the third contacts of the fourth relay to the corresponding first contacts to obtain a compensation temperature;
    connecting the third contacts of the second relay to the corresponding first contacts to discharge the capacitor;
    connecting the third contacts of the third relay to the corresponding second contacts to charge the capacitor; and
    connecting the third contacts of one relay connected to one of the thermo-couples to the corresponding first contacts, connecting the third contacts of the fourth relay to the corresponding first contacts, if the voltage at the thermo-couple is lower than the voltage of the power supply, the temperature at the thermo-couple is obtained by adding the compensation temperature to the value corresponding the voltage obtained at the thermo-couple.

\* \* \* \* \*